United States Patent [19]

O'Callaghan et al.

[11] Patent Number: 5,477,263

[45] Date of Patent: Dec. 19, 1995

[54] METHOD AND APPARATUS FOR VIDEO ON DEMAND WITH FAST FORWARD, REVERSE AND CHANNEL PAUSE

[75] Inventors: Daniel O'Callaghan, Fairfax Station, Va.; Eugene L. Lew, Olney, Md.

[73] Assignee: Bell Atlantic Network Services, Inc., Arlington, Va.

[21] Appl. No.: 249,572

[22] Filed: May 26, 1994

[51] Int. Cl.[6] .................................................. H04N 7/173
[52] U.S. Cl. .................................. 348/7; 348/13; 455/4.2
[58] Field of Search .................................. 348/7, 12, 13; 455/4.2, 5.1, 6.1; H04N 7/16, 7/173

[56] References Cited

U.S. PATENT DOCUMENTS

| | | |
|---|---|---|
| Re. 34,611 | 5/1994 | Fenwick et al. . |
| 4,506,387 | 3/1985 | Walter . |
| 4,709,418 | 11/1987 | Fox et al. . |
| 4,947,244 | 8/1990 | Fenwick et al. . |
| 5,068,733 | 11/1991 | Bennett . |
| 5,105,268 | 4/1992 | Yamanouchi et al. . |
| 5,132,992 | 7/1992 | Yurt et al. . |
| 5,133,079 | 7/1992 | Ballantyne et al. . |
| 5,168,353 | 12/1992 | Walker et al. ............ 455/5.1 |
| 5,172,413 | 12/1992 | Bradley et al. ............ 455/6.1 |
| 5,247,347 | 9/1993 | Litteral et al. . |
| 5,253,275 | 10/1993 | Yurt et al. . |
| 5,285,272 | 2/1994 | Bradley et al. . |
| 5,339,315 | 8/1994 | Maeda et al. ............ 348/7 |
| 5,341,474 | 8/1994 | Gelman et al. ............ 348/7 |
| 5,357,276 | 10/1994 | Banker et al. ............ 455/4.2 |
| 5,414,455 | 5/1995 | Hooper et al. ............ 348/7 |

*Primary Examiner*—James J. Groody
*Assistant Examiner*—Chris Grant
*Attorney, Agent, or Firm*—Lowe, Price, LeBlanc & Becker

[57] ABSTRACT

In a video distribution system, methods and apparatus for rapid channel selection are implemented to reduce the channel-to-channel latencies which might otherwise occur in modern video decoding systems, such as MPEG-2. In addition, methods and apparatus are implemented for providing fast forward, fast reverse and channel pause functionality when utilizing staggered start times for a particular program source.

10 Claims, 9 Drawing Sheets

| PROGRAM | PROGRAM MAP LOCATION | ELEMENTARY STREAM LOCATIONS | FRAME RATE | RESOLUTION | CRYPTO KEY | ETC |
|---|---|---|---|---|---|---|
| CBS | 132 | PID 56<br>PID 74 | 24 | 480 X 640 | XXXXXX | |
| NBC | 87 | | | | | |
| ABC | 61 | | | | | |
| HBO | 138 | | | | | |

METHOD AND APPARATUS FOR VIDEO ON DEMAND WITH FAST FORWARD, REVERSE AND CHANNEL PAUSE

TECHNICAL FIELD

The invention relates to the transmission and distribution of video programming and more particularly to a method and apparatus for rapid channel selection and for providing fast forward, reverse and channel pause functions when receiving digital video programming.

BACKGROUND ART

In recent years considerable attention has been focused on systems for providing wide arrays of video programming to subscribers. A number of commentaries have suggested that future systems will provide 500 channels of video information into each subscriber's home. The trend in development of video distribution, as in many communications industries, is toward all digital transmissions. In particular, a number of systems have recently been proposed for distributing video information in compressed, digital data form.

U.S. Pat. No. 5,247,347 to Litteral et al., the disclosure of which is herein incorporated in its entirety by reference, discloses an enhanced public switched telephone network which also provides a video on demand service using compressed digital data transmissions.

One network has been proposed for the distribution of compressed, digitized broadband information, including video information, to subscribers. That network utilizes optical fiber to connect information sources and subscribers to a broadband ATM switch. The fiber carries a standardized transport stream such as a SONET OC-12 transport stream. The techniques disclosed herein apply to other networks as well, such as ones in which QAM, ADSL, digital cross connect and multiple carrier transport mechanisms are used. An adaptive digital multiplexer/demultiplexer permits unused digital capacity on an optical fiber to be allotted to other video sources. A gateway, called a level 1 gateway, manages the establishment of connections between subscribers and the information sources. A digital entertainment terminal at the subscriber's location provides all necessary user functions for the use of the network.

The transmission of programming, in particular, video programming where wide bandwidth is required, has been known to include a variety of compression techniques. Modern decoders of compressed video information will adapt their operating modes in dependence upon the properties of the incoming signal. It is also often the case that video programming is distributed in multiplexed format which requires that either the decoder or an associated demultiplexer be aware of where in the multiplexed stream particular programs are located.

One of the widely accepted standards for the distribution of video programming is that promulgated by the Organisation Internationale de Normalisation (International Organization for Standardization) under Standard ISO/IEC JTC1/SC29/WG11 entitled "Coding of Moving Pictures and Associated Audio". The particular working group responsible for that standardization effort is also known as the Motion Picture Experts Group (MPEG).

MPEG compression and decompression standards have been evolving. The current advanced version is generally known as MPEG-2. The MPEG-2 standard is hereby incorporated by reference in its entirety. In the language of the MPEG-2 standard, a "program" comprises video source material and audio source material which share a common time base. One or more elementary digital streams representing the source material (e.g. video or audio), as well as other data, are combined into single or multiple streams suitable for storage or transmission. System coding follows the syntactical and semantic rules imposed by the MPEG-2 specification and provides information to enable synchronized decoding without either overflow or underflow of decoder buffers over a wide range of retrieval or receipt conditions.

Under the MPEG-2 standard, an incoming individual video signal and related audio signal are encoded and packetized into video packetized elementary stream (PES) and audio packetized elementary stream, respectively. The video and audio PES from one or more programs are combined into a transport stream for transmission or storage.

The transport stream is designed for use in environments where errors are likely, such as storage or transmission in lossy or noisy media. Transport stream packets are 188 bytes in length. Transport stream packets are generally divided into two sections. The first section constitutes header information and the second constitutes payload. Header information includes, among other information, a synchronization byte, transport scrambling control and a thirteen bit program identification (PID) indication. PID value 0 is reserved as an indication that the packet includes program association table data. PID value 1 is reserved for conditional access such as encryption. PID value 0x1FFF is reserved for administrative (no-op) packets utilized for synchronizing the link. Other program identification numbers are utilized to identify transport packets with the program source from which they originate.

FIG. 1 depicts a transport stream utilizing the MPEG-2 standard. As indicated above, each transport packet in the transport stream carries a program identification number (PID). Packets identified by PID 0 carry program association table information. As illustrated in FIG. 1, a program association table maps a particular program source with PID values assigned to packets associated with that source. Thus, the program association table defines PID identification of program maps for each source of programming in the transport stream. As illustrated, the program map for CBS is found in packets labeled PID 132; the program map for NBC is found in packets labeled PID 87 and so forth.

The program map for CBS illustrated in FIG. 1 as that associated with PID 132 identifies the PID numbers for the packetized elementary streams (PES) for the video and audio channels associated with the particular program. One should note at this time that more than two PID's may be associated with a program. For example, there could be a data channel associated with the program which would include data for closed captioning for the hearing impaired. There could be a number of audio elementary streams for, for example, carrying respective different languages. Thus the programming map provides some flexibility beyond that required for merely associating a single video and audio elementary streams.

Once the program map is known, the program decoder can be set to extract the desired elementary streams (e.g. PID 56 in FIG. 1 and PID 74 shown in FIG. 1) for decoding and presentation. Transport packets of PID=56 represents the video elementary stream associated with CBS' MPEG video system. Within CBS' video elementary stream are video sequence headers which define things like frame rate and resolution. After the video header sequence, the normal video syntax occurs which, in the case of MPEG, includes the normal frames associated with video compression such as I frames, B frames and P frames used in MPEG.

The elementary stream with, for example, PID=74 is the audio stream associated with the video shown in transport packets, such as those, for example, with PID=56 as defined in program map at PID=132.

A typical MPEG-2 transport demultiplexer and decoder is shown in FIG. 2. The data link specific interface 210 converts the incoming data link format (e.g. optical fiber encoded data) to a form (e.g. electrical) for demultiplexing and decoding. Transport stream demultiplexer 220 monitors the PID's of the incoming transport stream packets to identify those selected for decoding and routes those to respective video (230) and audio (240) decoders. Since the video and audio associated with the same program are derived from a common clock, clock control 250 drives both decoders. Note that the transport stream demultiplexer includes functionality, such as that described in connection with the description of the transport stream of FIG. 1, necessary to identify the particular PID's needed to extract information from the transport stream to present the desired program to the user.

In the distribution of video programming, and particularly in the context of video on demand, which can allow subscribers access to a large number of channels of video information, it may be desirable to provide a number of channels, each carrying the same program but with delayed start times. This is illustrated functionally in FIG. 3 in which a program source would presumably play one video repeatedly which could be transmitted over one channel undelayed and over subsequent channels delayed by incremental amounts from the start time of the first channel so that, at any one time, a number of channels carries the same program delayed by differing amounts. The transport stream will additionally include a plurality of broadcast channels. The subscriber will select from those channels available.

Referring again to FIG. 1, when a subscriber tunes, for example, to CBS for the first time, before decoding can take place, a program association table and the program map for the selected channel must be received in the stated order from the transport stream. Thereafter, a packet from the video elementary stream must arrive with header information about the frame rate, and resolution for display of the image and the like before the decoder can be set up to actually decode the payload data associated with the video elementary stream. This process takes a relatively great deal of time even in the high-speed world of digital video transmission. The process must be repeated each time a new channel is selected. As a result, if a subscriber switches channels quickly (channel surfing), in an attempt to glimpse what is on each channel, the set-up time for each channel can be significant and the process of moving from channel to channel likely becomes much slower than a user would find acceptable. One way around this problem is to repeat header information often, but this results in a loss of bandwidth which would reduce the quality of the resultant image.

This delay problem existing in modern video compression systems also exists with respect to encryption. When a particular video program is encrypted, the encryption key is sent only infrequently. When first tuning to an encrypted program source, the subscriber would necessarily need to wait for the encryption key to be downloaded, assuming he is authorized, before decoding of the picture could begin. As a result, the speed at which channels can be changed is further inhibited.

In the distribution of video programming, it is desirable to provide the user with VCR-like functionality, including fast forward, fast reverse and channel pause features. Provision of these features is difficult if one program source is being provided to a number of users in a broadcast-like function, when using a digital transport stream like the ones previously described. An individual subscriber cannot affect the playback, for example, without affecting the playback for all subscribers currently tuned to that program.

DISCLOSURE OF THE INVENTION

Accordingly, an object of the invention is to provide fast user channel change capability for a compressed digital data input stream.

Another object of the invention is to receive encrypted programming from a multichannel digital stream without delay.

Yet another object of the invention is to obtain VCR-like functionality with a received compressed digital data input stream.

The above objects and other objects of the invention are satisfied, at least in part, by providing a channel decoder for selecting and decoding one of a plurality of programs, such as video programs, from a transport stream of digital data, such as an MPEG-2 transport stream. Programs have properties which may vary from program source to program source such as resolution and frame rate. For example, movies typically are shown at 24 frames per second whereas live video is shown at 30 frames per second. Although frame rate and resolution are expressly mentioned, the invention encompasses any encoded variable parameter(s) of the MPEG syntax or of other syntax necessary to recover the encoded video.

The objects recited above and other objects of the invention are achieved by providing a channel decoder for decoding one of a plurality of programs which have properties such as resolution and frame rate which may vary from program to program and from time to time. A user activates a selection mechanism such as a remote unit for selecting a program. Once selected, at least one elementary stream of the program is provided for decoding. A parameter monitor and store identifies and stores at least one property of each program selected. An elementary steam decoder decodes an elementary stream into output data in accordance with the properties stored by the parameter monitor and store for the particular program associated with the elementary stream. Thus, when a program is selected, the elementary stream decoder is initialized with stored information about the program.

User activated program selection can occur by using a transport stream demultiplexer which selects one program from a transport stream containing a plurality of programs or it can occur by using circuit switching for selecting one program from a plurality of programs available over a switched network.

The types of properties which can be the object of detection and storage include but are not limited to: (1) the location of one or more program elementary streams within the transport stream and (2) control parameters for the decoder such as frame rate, resolution or encryption key.

The invention is also directed to a method of permitting rapid channel change in a system having a channel decoder for selecting and decoding one of a plurality of programs. The representation of each program has properties which may vary from program to program and from time to time, and that information is detected and stored and the channel decoder is initialized with the stored information about one particular program when that program is selected.

The invention is also directed to apparatus for providing special functions such as fast forward, fast reverse and program pause for a user receiving a particular program in a system providing a plurality of programs. At least one group of programs of said plurality of programs contains different versions of the same program source material, the versions having staggered starting times (i.e. one offset by a respective number of time delay increments from a first program of said group). A memory contains a data structure having information identifying how to access each program of said group and contains a pointer to the program of said group which should be decoded for presentation to said user. A user indicates desired program selection activates special functions using conventional apparatus such as a remote control or panel switches. When a user indicates that the user requires a special function the pointer is changed to point to a program with a different starting time.

When the special function indicated is that of fast forward, the pointer is changed to point to a program starting earlier than the program pointed to when said indication was received.

When the special function indicated is that of fast reverse, the pointer is changed to point to a program starting later than the program pointed to when said indication was received.

When the special function indicated is that of program pause, when a first pause indication is received, a pause time stamp of the last block of data received prior to receipt of said pause indication is stored. When a second pause indication is received, the pointer is changed to point to the first later starting program of the group which has a block time stamp earlier than that stored in response to the first pause indication. Resumption of display is deferred until the time stamp of the data block being received equals that of the pause time stamp.

The invention is also directed to a method of providing rapid channel selection in a digital program distribution system having a channel decoder in which information about the properties or location of programs or both is downloaded to the decoder during initialization, and the operational state of said decoder is set based on that information when a program is selected.

The invention is also directed to a method of providing fast forward, fast reverse and channel pause functions in a program distribution system in which at least one program is distributed in a plurality of versions having staggered start times in which, at the user location, one of said versions is selected in dependence on a selected one of said functions; and the version of the program selected is decoded for presentation to the user.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

FIG. 5 depicts exemplary components of information contained within storage such as utilized in FIG. 4.

BEST MODE FOR PRACTICING THE INVENTION

Figure 4:
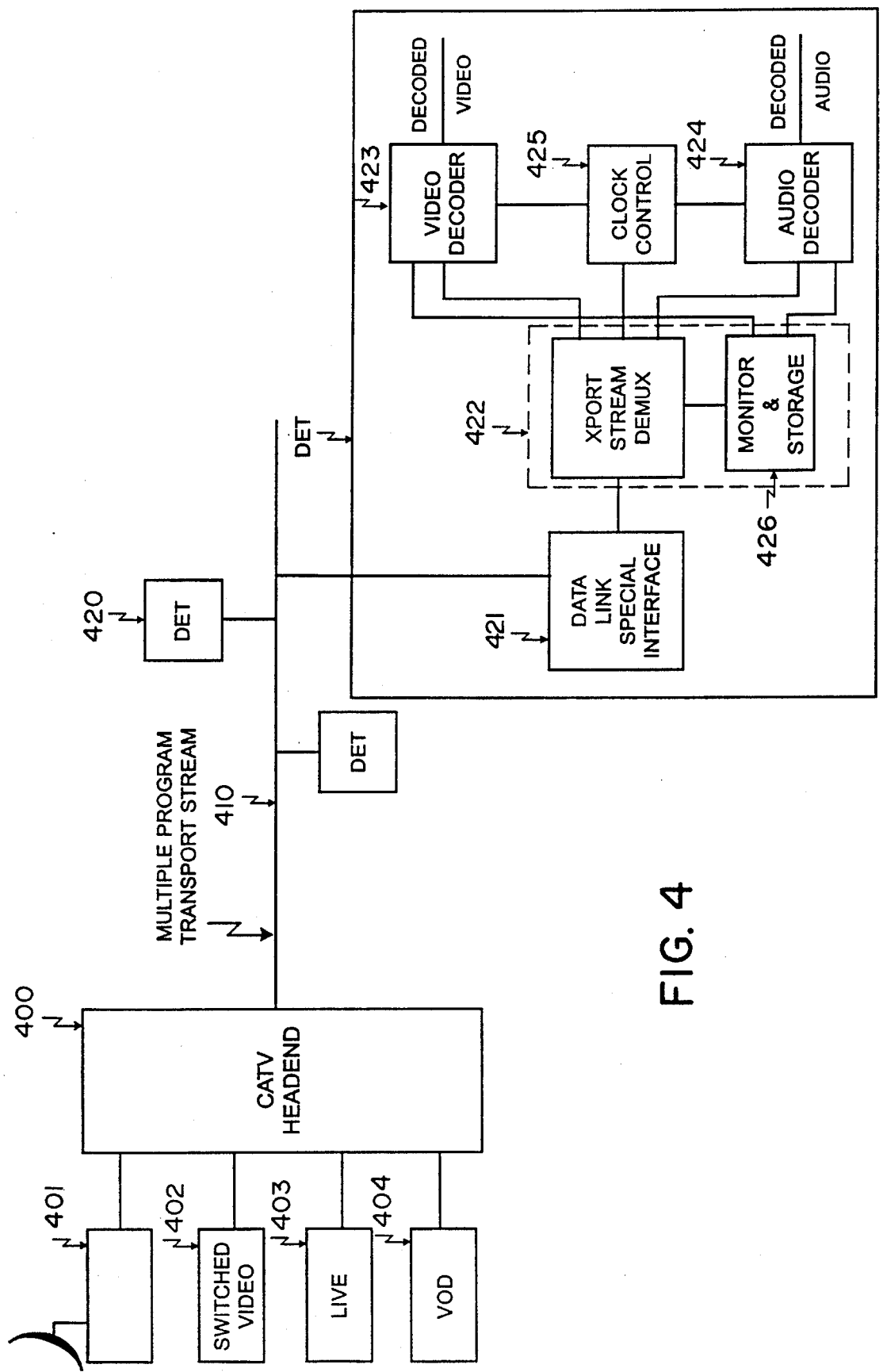
FIG. 4 depicts one embodiment of the invention utilizing monitoring and storage at a subscriber's location.

The principles of the invention are applicable to a large number of implementations. For simplicity of presentation, a CATV distribution model will be utilized. Such a model is shown in FIG. 4. In a CATV distribution system, a CATV head end 400 supplies a number of channels of video programming in an MPEG-2 multiple program transport stream over a distribution medium 410 such as, for example, coaxial cable, copper line, fiber optical cable, or wireless transmission. Programming can be derived from a number of sources. Typical sources illustrated in FIG. 4 include a satellite down-link 401, a switched video circuit 402 from a video switching network, a live feed 403 or a video on demand (VOD) server 404. Individual digital entertainment terminals (DET) are located at each subscriber's premises. A DET is essentially an intelligent set top box. The DET may be subject to user infrared remote control in a conventional manner. The functionality of a DET could, of course, be incorporated into a TV set instead of being a stand-alone component.

Figure 2:
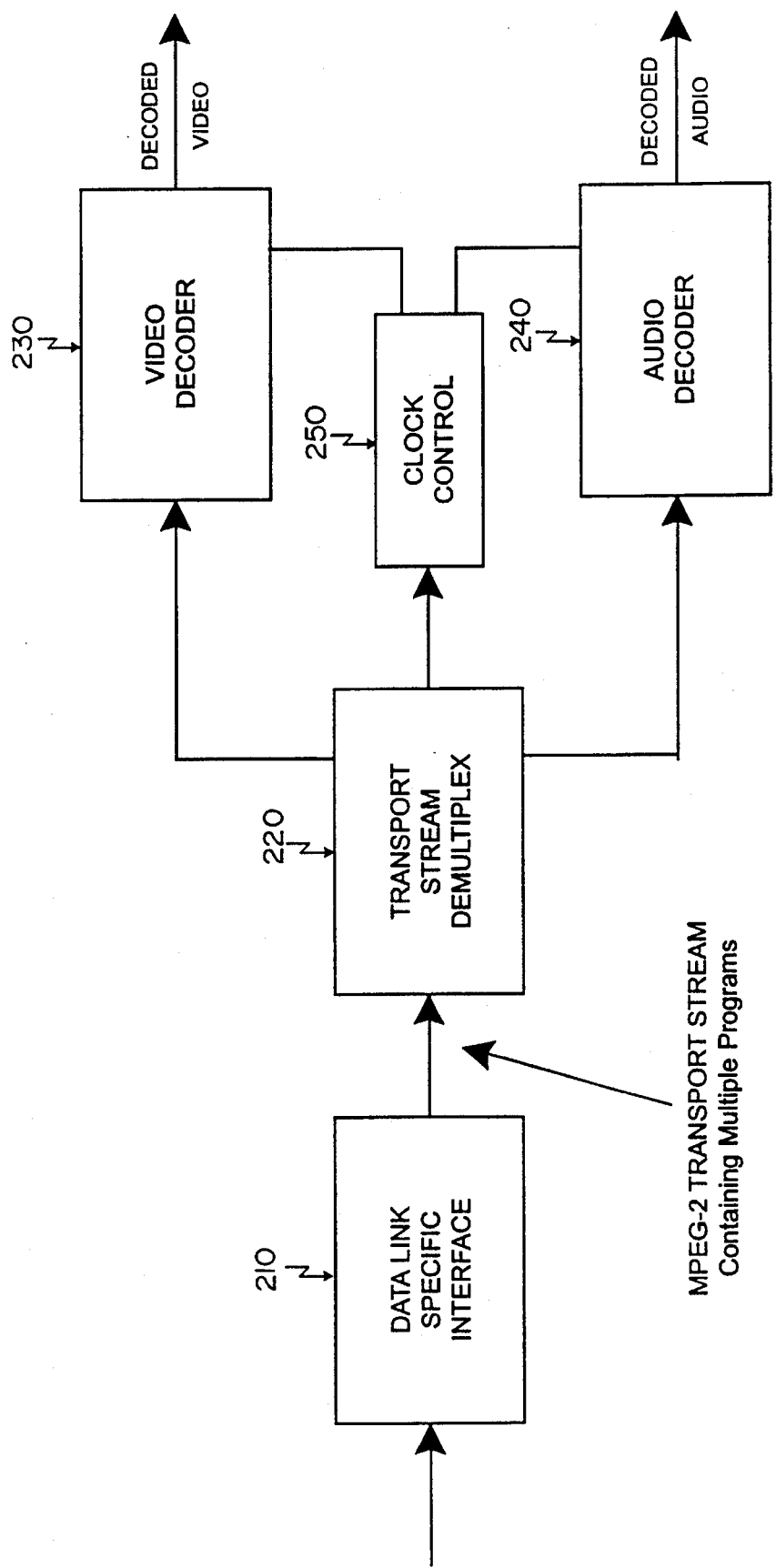
FIG. 2 depicts a generic MPEG-2 decoder.
Figure 3:
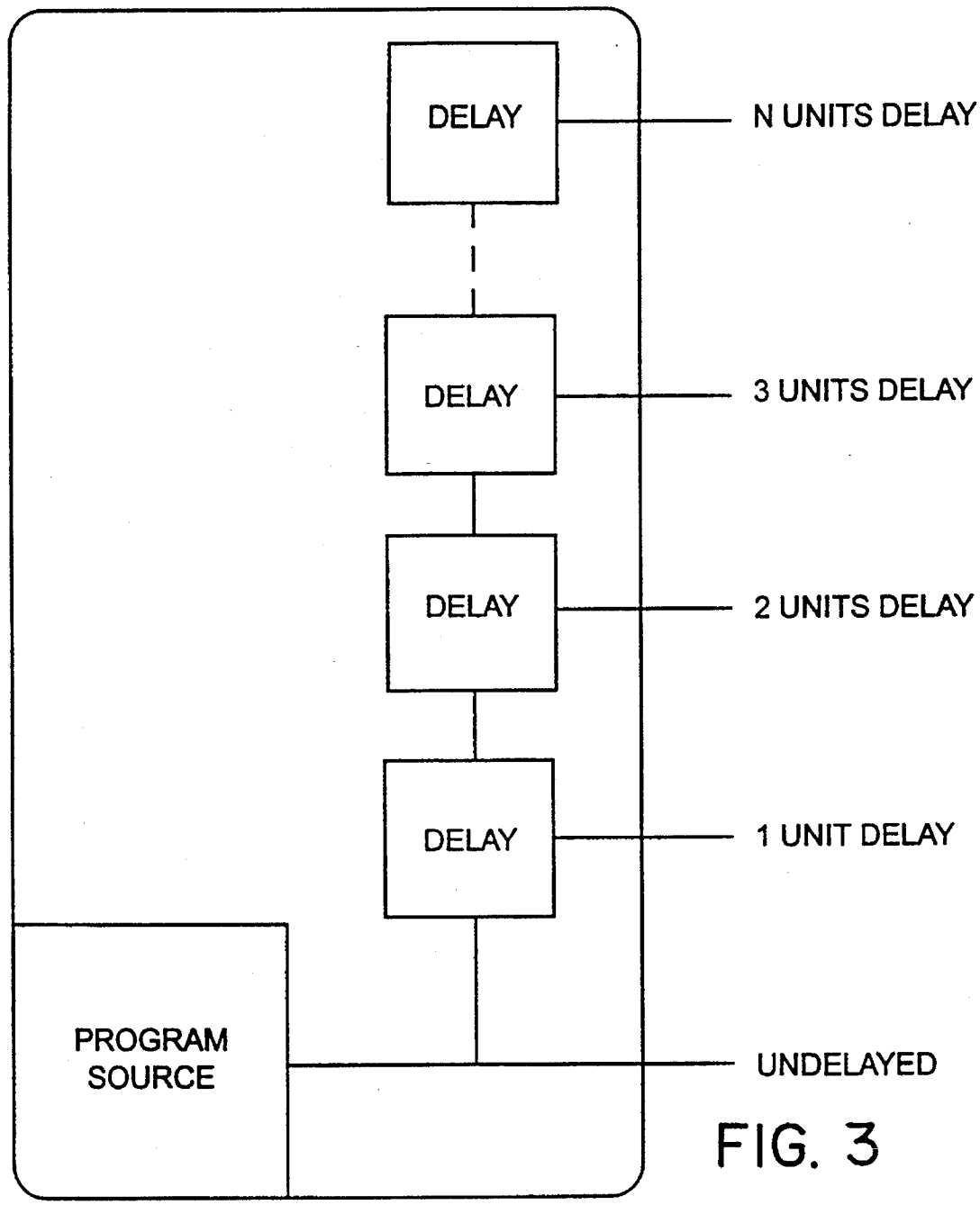
FIG. 3 depicts functionally the use of staggered start times for a single program delivered as separate programs within a program group.

The digital entertainment terminal exemplified in FIG. 4 includes a link specific interface 421, a transport stream demultiplexer 422, a video decoder 423, an audio decoder 424 and clock control 425, for implementation of the generic MPEG-2 decoder shown in FIG. 2. The transport stream demultiplexer and the video and audio decoders are constructed to respond and feed information to monitor and storage unit 426.

The monitor and storage unit 426 is illustrated as a part of transport stream demultiplexer but the functionality could be implemented as part of other components of the DET or as a stand alone component. Specifically, the functionality of monitoring and storage could be implemented with software running on DET microprocessor 660 of FIG. 6.

Figure 1:
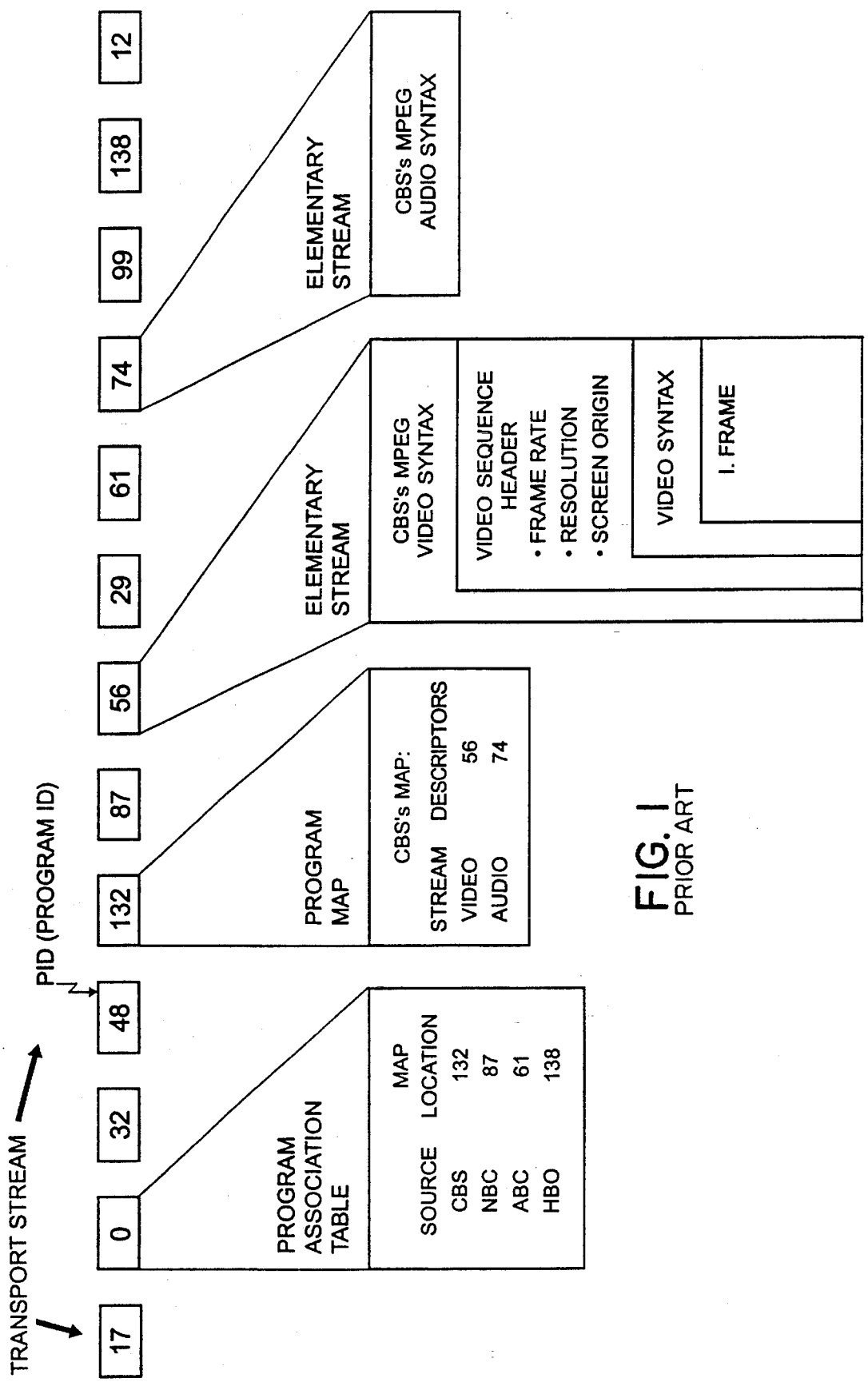
FIG. 1 depicts the use of an MPEG-2 transport stream in delivering video programming.

The monitor and storage unit 426 monitors the incoming transport stream on an ongoing basis, examining every packet. The latest version of the program association table (PID=0 of FIG. 1) is extracted and stored for later use. A data structure suitable for such use is shown in FIG. 5. Also extracted from the data stream, are the program map information (e.g. PID 131 of FIG. 1), information from video sequence headers of video elementary streams defining, for example, frame rate, resolution and information to facilitate set up of the audio decoder. Alternatively, data entries for a particular program can be updated only when that program is selected for reception. This approach imposes fewer demands on the CPU used for implementing the DET.

The monitor and storage unit 426 is capable of being preloaded with information during an initialization sequence such as might occur during DET turn on. In one scenario, the DET, upon turn-on (either power-up or warm start) would send a message to the head end 400 via the signalling channel (FIG. 6) of the data link specific interface. The head end would then send a data packet using, for example, a transport packet with the adaptation field set to 11, for example, and the transport private data flag set to 1 which would be received by the monitor and storage unit to store the pre loaded data sent from the head end 400.

The monitoring and storage unit permits rapid channel changing without a need to wait for the particular transport packets that contain the information required to set up the transport stream demultiplexer and the elementary stream decoders.

FIG. 5 depicts one organization of information (i.e., a table) which could be utilized in conjunction with FIG. 4. Stored table 500 includes program field 510, program map location field 520, elementary stream location (PID's) field 530, frame rate field 540, resolution field 550, crypto key field 560 and locations for additional information. It is only necessary that one or more of the fields be included to facilitate acceleration of the switching time between channels by eliminating waiting states while information is being downloaded. Typically these are fields that affect the operation of either the transport stream demultiplexer or the elementary stream decoders.

Figure 6:
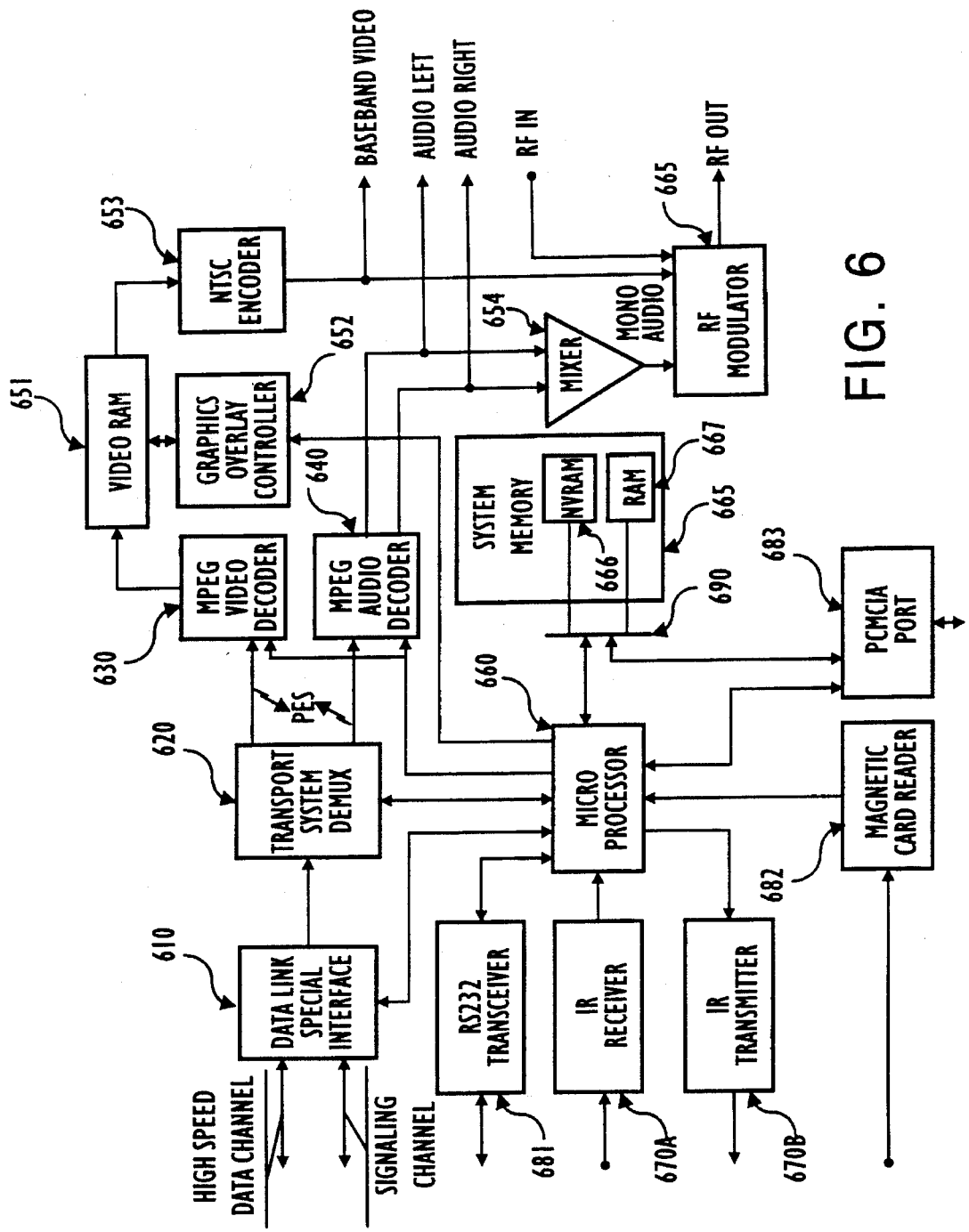
FIG. 6 is a block diagram of a digital entertainment terminal (DET) used in FIG. 4.

FIG. 6 depicts an implementation of a digital entertainment terminal at a functional level. Data link specific interface 610, transport system demultiplexer 620, MPEG video decoder 630 and MPEG audio decoder 640 correspond generally to the generic MPEG decoder described in conjunction with FIG. 4. Video RAM 651, graphics overlay controller 652, NTSC encoder 653, mixer 654 and RF modulator 655 perform the usual functions associated with such devices in a video processing environment. The graphics overlay controller permits text to be overlaid on top of images and permits the display of menus required for information about available programming and selection information. Video RAM 651 is a standard video buffer. NTSC encoder 653 translates bit mapped video from the video RAM into base band video using the NTSC raster scan format. RF modulator 655 combines audio and video signals from the NTSC encoder 653 and the mixer 654 and translates them to different position in the frequency spectrum, typically to the frequency of an incoming channel on a standard television set.

Microprocessor 660 controls the DET. System memory 665 shares a bus 690 with the microprocessor 660. System memory is partitioned into non-volatile random access memory (NVRAM) 666 and random access memory 667. The information discussed in conjunction with FIGS. 4 and 5 is stored in system memory.

IR receiver and IR transmitter 670A and 670B, respectively, provide an infrared interface to a standard infrared remote control. The remote control will send channel selection and channel change signals to the microprocessor over the IR receiver and optionally receive commands and display information back from the microprocessor over IR transmitter link 670B. The information transmitted over the infrared link to the DET includes fast forward, fast reverse and channel pause information. The microprocessor responds to the information received from the remote control and implements channel selection and channel change utilizing the information from the table in system memory to set up the transport system demultiplexer and the MPEG video and audio decoders in accordance with the stored parameters, such as those illustrated in FIG. 5. As described more hereinafter, activation of fast forward, fast reverse or channel pause is also implemented using information stored in system memory.

RS232 transceiver 681 and PCMCIA port 683 represent traditional data IO ports. Magnetic card reader 682 permits the use of credit card, debit card or other types of authorization cards for payment of billing generated through the digital entertainment terminals linked to the central office.

Figure 7:
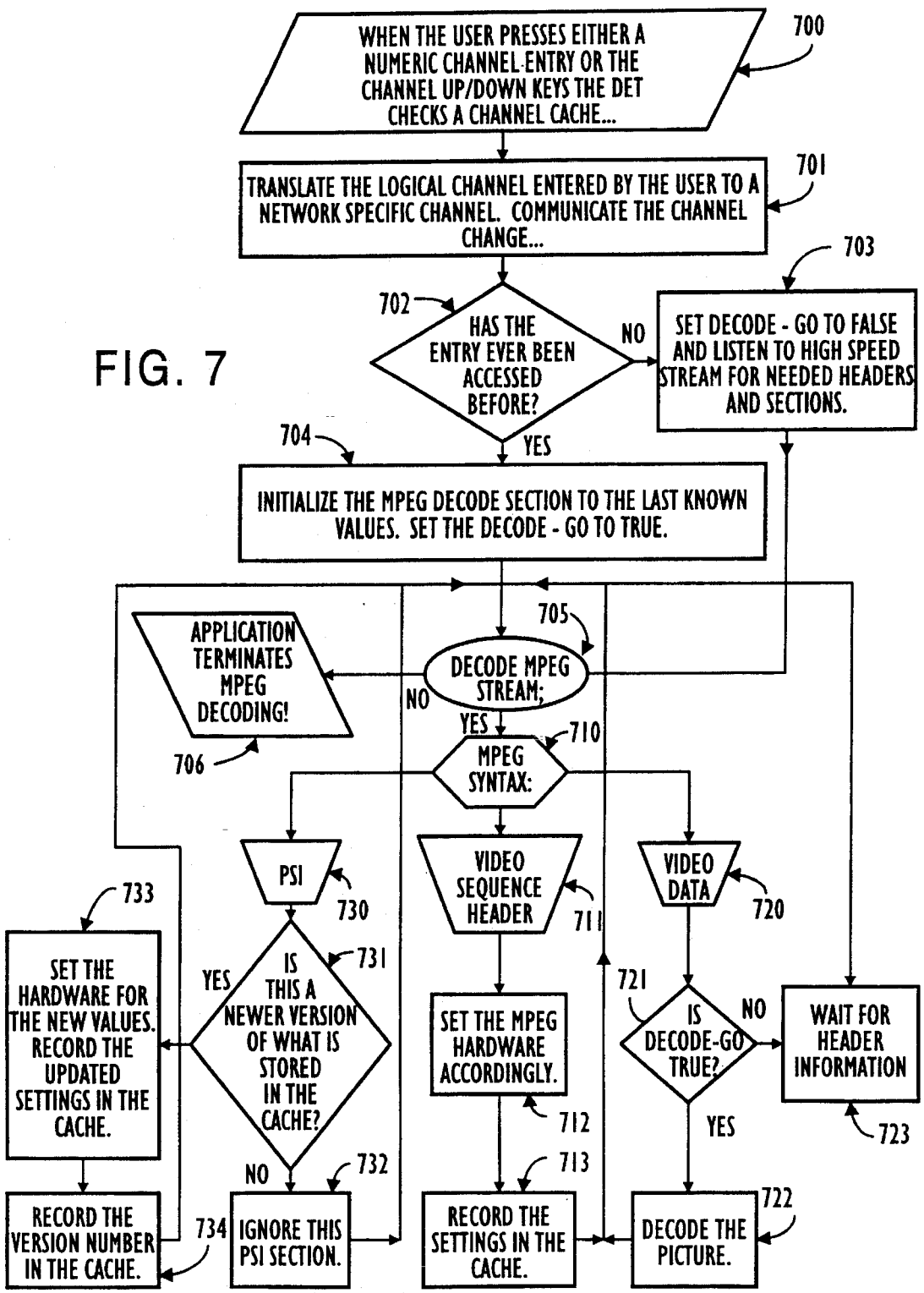
FIG. 7 represents a channel change logic used by the embodiment of FIG. 4.

FIG. 7 illustrates the flow of the logic required to implement the information storage of FIGS. 4 and 5. The storage can essentially can be thought of as a type of cache memory which stores the last value sent for a particular data item if it represents a change from the pervious value. Cache memory permits values to be retrieved from a convenient storage (in this case at the DET) without the necessity of going to the source of the original information (the transport stream).

FIG. 7 depicts channel change logic for effecting programming selection. Operationally, a channel change indication is detected in block 700. The channel selected is translated to a specific network channel in block 701. A decision is made whether the channel selected has been previously selected at block 702. If it has not, the signal Decode-go is set to false (703) and the high speed channel is monitored for the headers and sections needed to decode the program. When these are received, the information is used to decode the MPEG stream (705). If the channel has been previously selected, the MPEG decode section is initialized to the last known values (704) and decoding begins (705). If decoding cannot occur successfully, the application terminates decoding (706). If decoding is successful, the incoming MPEG transport stream is examined and classified into one of three categories (710). The first is a video sequence header which refers to a PID with program information. The "video sequence header" branch (711–713) examines the header (711) of video packets containing video data payload. If the settings contained in the header differ from the last time a video sequence header was received for that program, the new settings would be stored in cache (713) and applied to the decoder. Once past the header, the "video data" payload is decoded (722) if the signal decode-go is true (721). If there is no disparity between the header information and the cache settings for the program, decode-go will be true and the payload video data will be immediately decoded.

The third branch of the MPEG syntax is the "PSI" branch (730–734). PSI stands for program specific information and includes four types of table information defined by the MPEG standard, namely the program association table, the program map table, the network information table and the conditional access table. While the structures may be thought of as simple table data structures, when the length exceeds the length of a transport packet payload the structures may be segmented and inserted into one or more MPEG-2 transport packets. PSI can also be used to pre-load the cache with information from a central source for a plurality of programs during an initialization sequence.

Figure 8:
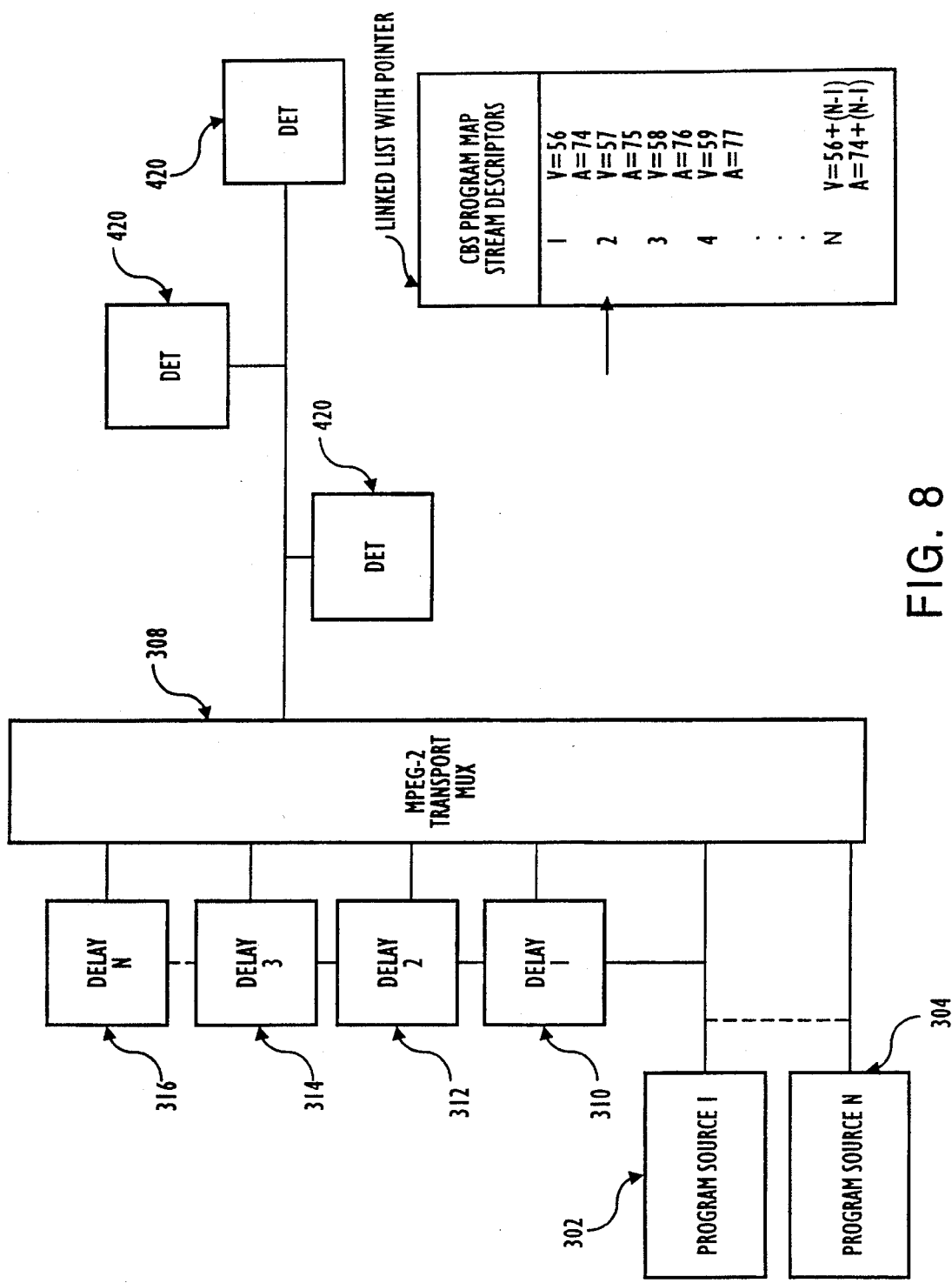
FIG. 8 depicts an additional embodiment of the invention which utilizes a program map to distinguish programs of a program group having staggered start times.

FIG. 8 shows, in more detail, the provision of a plurality of program sources 302, 304, at least one of which is available for VCR-like functionality. Program source 1 (shown at 302) is repeatedly applied to the transport mux 308 at staggered starting times through delay units 310–316. The output data stream, containing program 1 reiterations as well as the other program sources are made available to DETs 420, which may be comprised of the elements shown in FIG. 4.

When using staggered starting times, a modification of the program map is utilized to define which set of PIDs is associated with each of the different starting times. The program map illustrated for CBS in FIG. 8 can be implemented as a linked list with a pointer directed to the program source currently being viewed by a subscriber.

A number of techniques are suitable for generating staggered start times for a program source. FIG. 8 depicts the functionality of staggered start times. How that functionality is implemented can vary. Obviously, individual delay elements could be stacked to provide the delay. Alternatively, a large random access memory could be used to store, for example, thirty minutes of program material in a sliding window with a plurality of output ports reading from the memory a different point relative to the most recently received data.

Figure 9:
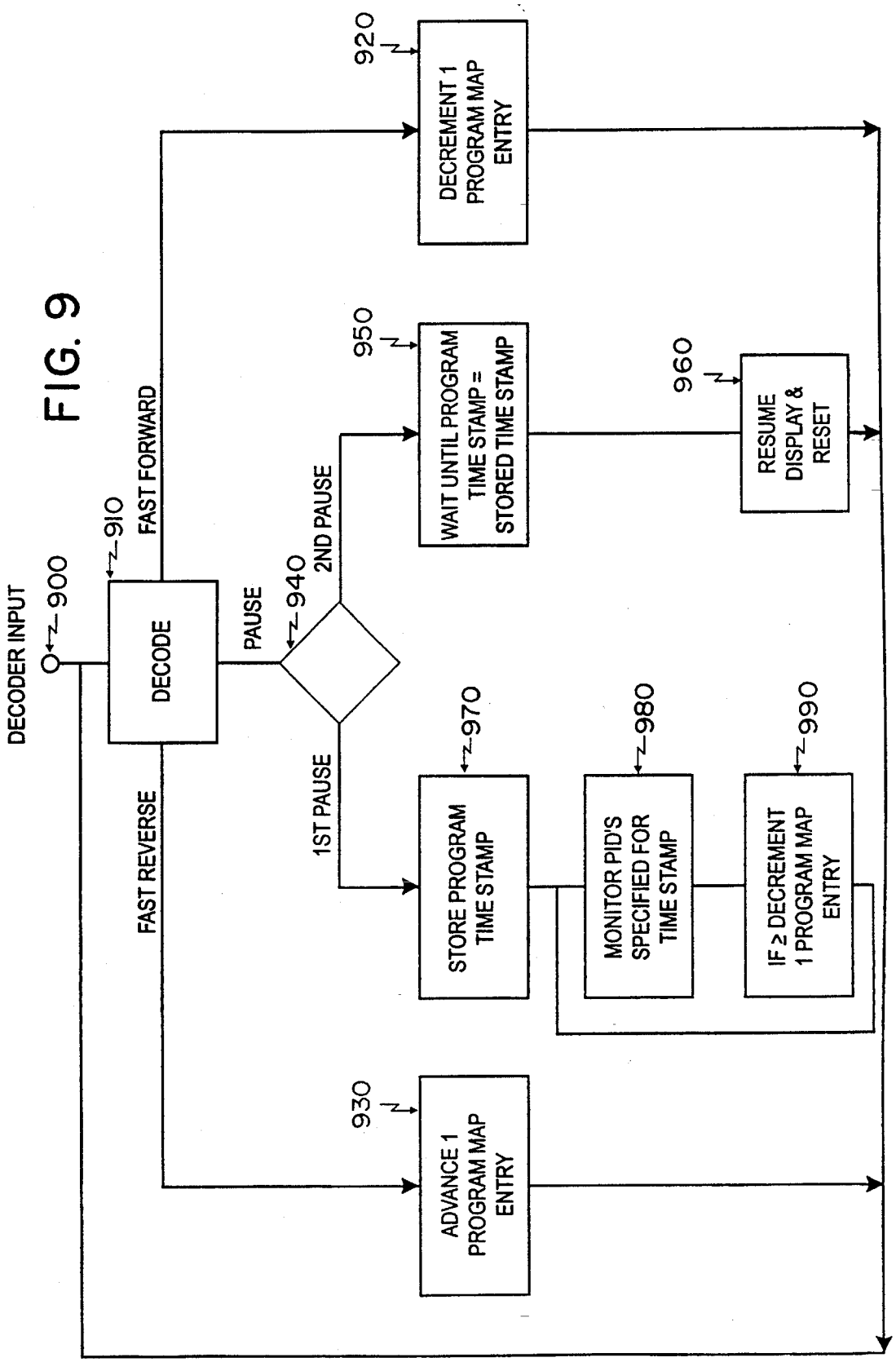
FIG. 9 represents a flow chart of the logic of the fast forward, fast reverse and channel pause functions.

As shown in FIG. 9, in operation, when a subscriber indicates a desire to fast forward, fast reverse or pause, such as by activating a control on the DET or by selecting the function using a remote control, the signal indicating such desire is received at 900 and decoded at 910.

If the subscriber desires to advance quickly through a program, the pointer in the linked list of the table shown in FIG. 8 would be advanced one unit (920) to point to the next earliest beginning program source thereby moving to a later point in the program by an amount $\Delta t$.

Similarly, when one desires to do a fast reverse, the location of the pointer would be decremented (930) to point to the next later beginning program thus reverting to an earlier point in the programming material. Repeated activations (manual or automatic repeat) of the subscriber activated control signal would allow a user selectively to advance or retard, in increments of $\Delta t$, the viewing location within the program.

If channel pause is selected, the middle branch (940) of the three branches shown in FIG. 9 is selected. The middle branch distinguishes between the first and second activations of the pause button. When a first activation occurs, a time stamp associated with the last complete block of data received prior to receipt of said pause indication is stored (970).

MPEG-2 packets carry time stamps which relate to an overall time frame associated with the start of the program. The time stamps are utilized to coordinate the arrival of MPEG-2 packets. For example, if MPEG-2 audio packets arrive early at the audio decoder, that is, before the related video packets arrive, they will be held until the corresponding video packets arrive and then both audio and corresponding video packet information will be released simultaneously at exactly the right time to be part of a smooth flowing program presentation. The time stamp controls the release.

For pause functionality, the stored time stamp is compared with the time stamp of incoming PIDs (980) for the program specified. If the time stamps of the incoming PIDs of the program pointed to by the pointer equals or exceeds the stored time stamp (990), the position of the pointer in the linked list is incremented to the next later beginning program. This operation continues until a second pause indication is received. If the second pause indication is received, the system will monitor incoming PIDs until the time stamp for the particular program under consideration is received which equals the stored time stamp of the pause indication (950). Once that happens, display of the ongoing video resumes (960) with the next block of data in the sequence of time stamped blocks.

Accordingly, there has been described a method and apparatus for rapid channel selection for the implementation of fast forward, fast reverse and channel pause functions. In this disclosure, a preferred embodiment of the invention is described utilizing MPEG-2 encoding. However, as aforesaid, it is to be understood that the invention is capable of use in other video distribution systems using encoding techniques independent of MPEG.

Further, the multi-channel CATV like data stream shown in the network environment of FIG. 4 is presented as an example to facilitate understanding of the power of the invention. Practical implementations may preferably be in switched program environments in which only one encoded program is selected from a plurality available, and the selected program is individually switched to the subscribers's premises.

It should be understood that the invention is capable of use in various other combinations and environments and is capable of changes or modifications within the scope of the inventive concept is expressed herein.

What is claimed is:

1. Apparatus for providing special functions for a user receiving a particular program in a system providing a plurality of programs, at least one group of programs of said plurality of programs comprising the same program source material with staggered starting times offset by respective numbers of time delay increments from a first program of said group, comprising:

a memory containing a data structure having information identifying how to access each program of said group and containing a pointer to the program of said group which should be decoded for presentation to said user;

a user control apparatus for indicating program selection information and for activating special functions; and means responsive to an indication from said user control apparatus that the user requires a special function for changing said pointer to point to a program with a different starting time.

2. Apparatus as set forth in claim 1 further comprising a decoder for decoding said program with a different starting time.

3. Apparatus as set forth in claim 1 in which the special function is that of fast forward and the means for changing said pointer changes the pointer to point to a program starting earlier than the program pointed to when said indication was received.

4. Apparatus as set forth in claim 1 in which the special function is that of fast reverse and the means for changing said pointer changes the pointer to point to a program starting later than the program pointed to when said indication was received.

5. Apparatus for providing channel pause for a user receiving a particular program in a system providing a plurality of programs, at least one group of programs of said plurality of programs comprising the same program source material with staggered starting times offset by respective numbers of time delay increments from a first program of said group, comprising:

a memory containing a data structure having information identifying how to access each program of said group and containing a pointer to the program of said group which should be decoded for presentation to said user;

a user control apparatus for indicating program selection information and for activating special functions;

means responsive to an indication from said user control apparatus that the user requires channel pause for changing said pointer to point to a program with a different starting time; and means responsive to a first pause indication from said user control apparatus for storing a pause time stamp of the last block of data received prior to receipt of said pause indication and the means for changing said pointer includes means responsive to a second pause indication from said user control apparatus for changing the pointer to point to the first later starting program of said group with a block time stamp earlier than that stored in response to the first pause indication and for delaying resumption of display until the time stamp of the data block being received equals that of the pause time stamp.

6. Apparatus for providing special functions for a user receiving a particular program in a system providing a plurality of programs in MPEG format, at least one group of programs of said plurality of programs comprising the same program source material with staggered starting times offset by respective numbers of time delay increments from a first program of said group, comprising:

a memory containing a data structure having MPEG program identification information identifying how to access each program of said group and containing a pointer to a PID of a program of said group which should be decoded for presentation to said user;

a user control apparatus for indicating program selection information and for activating special functions; and means responsive to an indication from said user control apparatus that the user requires a special function for changing said pointer to point to a program with a different PID.

7. Apparatus as set forth in claim 6 in which the special function is that of fast forward and the means for changing said pointer changes the pointer to point to a PID of a program starting earlier than the program pointed to when said indication was received.

8. Apparatus as set forth in claim 6 in which the special function is that of fast reverse and the means for changing said pointer changes the pointer to point to a PID of a program starting later than the program pointed to when said indication was received.

9. Apparatus as set forth in claim 6 in which the special function is that of program pause and the apparatus further comprises means responsive to a first pause indication from said user control apparatus for storing a pause time stamp of the last block of data received prior to receipt of said pause indication and the means for changing said pointer includes means responsive to a second pause indication from said user control apparatus for changing the pointer to point to the PID of a later starting program of said group with a block time stamp earlier than that stored in response to the first pause indication and for delaying resumption of display until the time stamp of the data block being received equals that of the pause time stamp.

10. Apparatus as set forth in claim 6 in which said MPEG format is MPEG-2 format.

* * * * *